US009919460B2

(12) United States Patent
French et al.

(10) Patent No.: US 9,919,460 B2
(45) Date of Patent: Mar. 20, 2018

(54) OZONE ADHESION PROCESS FOR INSULATING CONTAINER MANUFACTURE

(71) Applicant: YETI Coolers, LLC, Austin, TX (US)

(72) Inventors: John French, The Hills, TX (US); Paul Nugent, Reading, PA (US); Francis Laxamana, Angeles (PH); Argel Adarlo, Angeles (PH)

(73) Assignee: YETI Coolers, LLC, Austin, TX (US)

( * ) Notice: Subject to any disclaimer, the term of this patent is extended or adjusted under 35 U.S.C. 154(b) by 0 days.

(21) Appl. No.: 15/631,199

(22) Filed: Jun. 23, 2017

(65) Prior Publication Data

US 2017/0291333 A1    Oct. 12, 2017

Related U.S. Application Data

(63) Continuation-in-part of application No. 14/665,494, filed on Mar. 23, 2015, now Pat. No. 9,694,521.

(51) Int. Cl.
| | |
|---|---|
| B29C 44/00 | (2006.01) |
| B29C 44/12 | (2006.01) |
| B29C 44/18 | (2006.01) |
| B29C 44/34 | (2006.01) |
| B65D 81/38 | (2006.01) |
| B29K 75/00 | (2006.01) |
| B29K 105/04 | (2006.01) |
| B29L 31/00 | (2006.01) |
| B29C 41/04 | (2006.01) |

(52) U.S. Cl.
CPC ............ *B29C 44/129* (2013.01); *B29C 44/18* (2013.01); *B29C 44/3403* (2013.01); *B65D 81/3816* (2013.01); *B65D 81/3823* (2013.01); *B29C 41/042* (2013.01); *B29K 2023/06* (2013.01); *B29K 2075/00* (2013.01); *B29K 2105/04* (2013.01); *B29K 2995/0015* (2013.01); *B29K 2995/0092* (2013.01); *B29L 2031/712* (2013.01)

(58) Field of Classification Search
CPC ......................... B29C 44/129; B65D 81/3823
See application file for complete search history.

(56) References Cited

U.S. PATENT DOCUMENTS

| | | |
|---|---|---|
| 6,257,764 B1 | 7/2001 | Lantz |
| 2003/0087982 A1 | 5/2003 | Kanazawa |

OTHER PUBLICATIONS

McIntyre et al., "New UV/ozone treatment improves adhesiveness of polymer surfaces," Modern Plastics, Mar. 1995, 4 pages.
Zander et al., "Oxidation of Ployethylene: A Comparison of Plasma and Ultraviolet Ozone Processing Techniques," Army Research Laboratory, Jan. 2009, 22 pages.
Jun. 14, 2016—(WO) International Search Report and Written Opinion—App. No. PCT/US2016/023398—10 pages.

*Primary Examiner* — Timothy Kennedy
(74) *Attorney, Agent, or Firm* — Banner & Witcoff, Ltd.

(57) ABSTRACT

Systems and methods for improving adhesion of an insulating foam to a molded polymeric insulating structure through use of ozone gas for functionalization of molded polymeric surfaces of an internal cavity of the insulating structure.

20 Claims, 8 Drawing Sheets

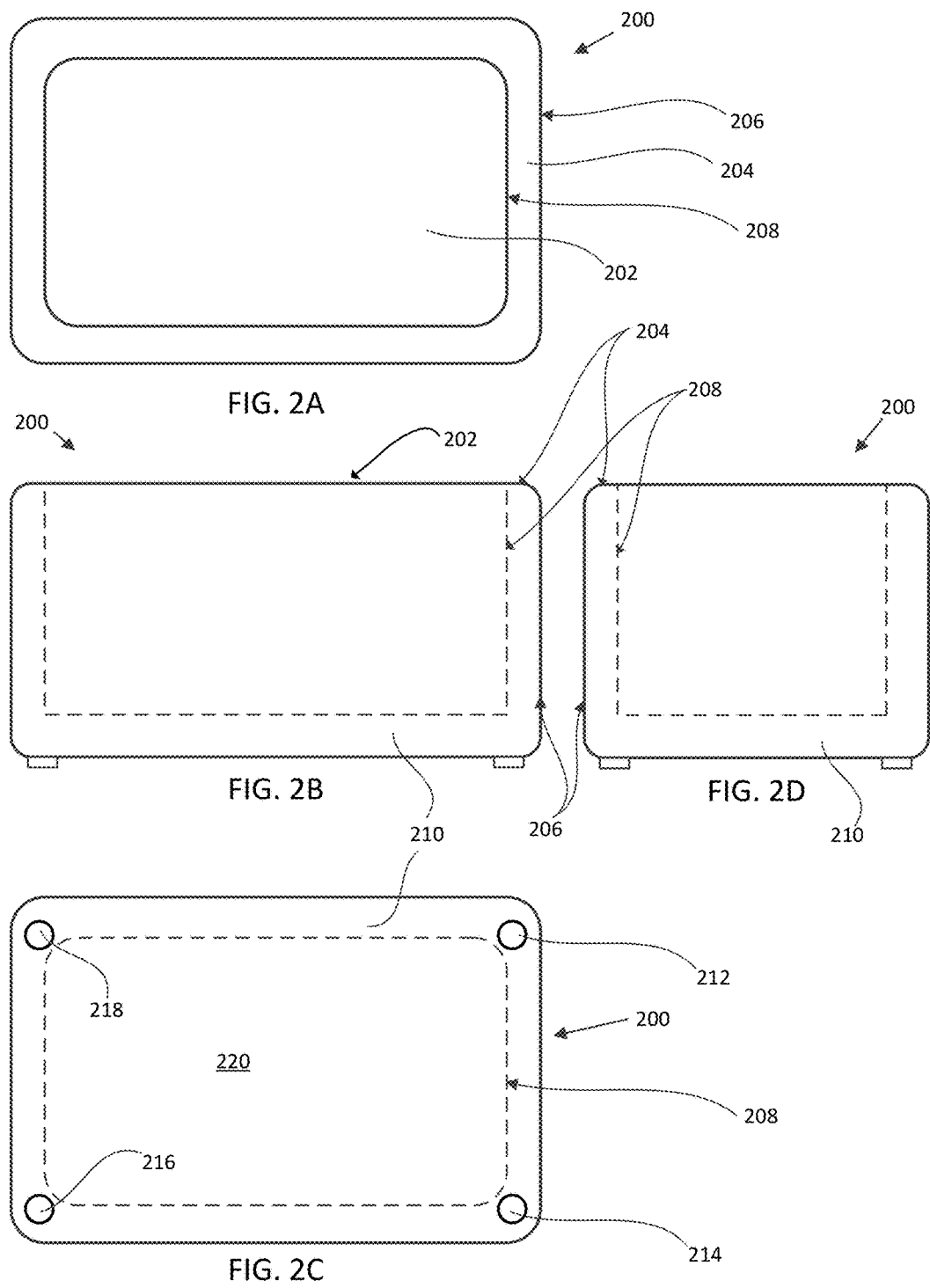

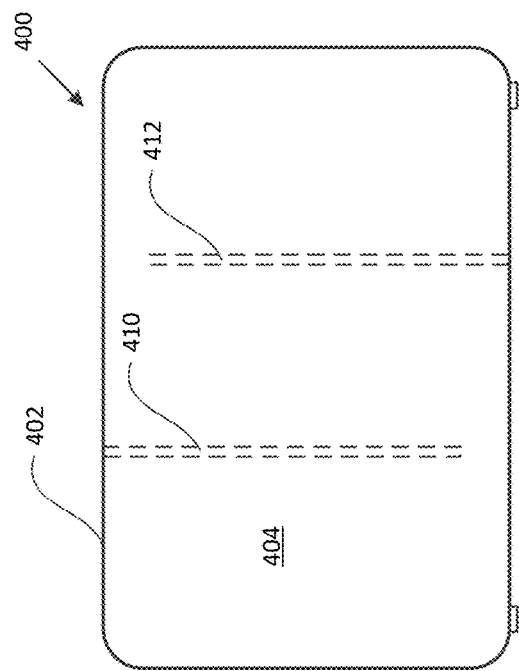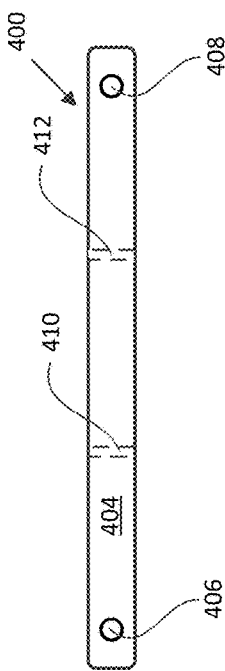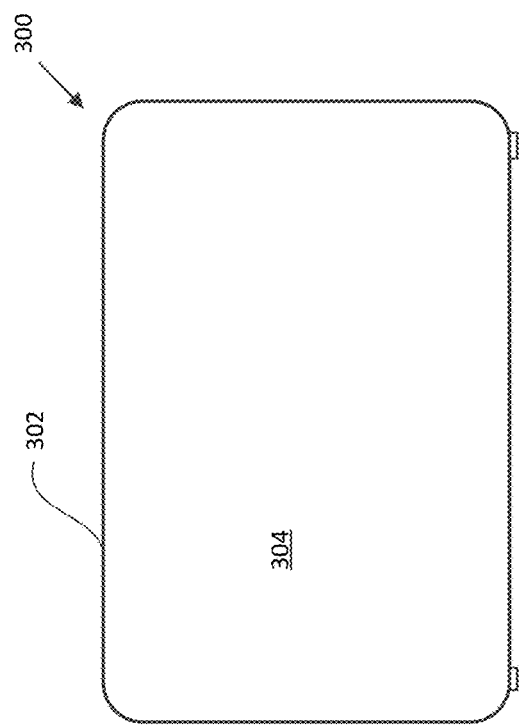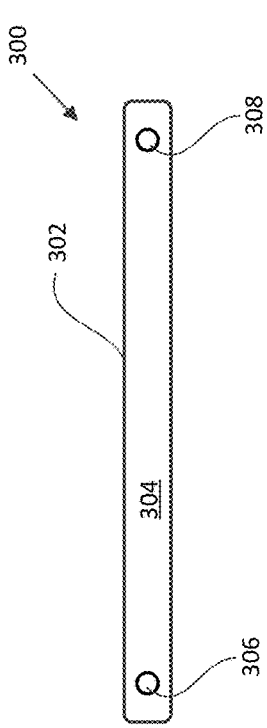
FIG. 4A
FIG. 4B
FIG. 3A
FIG. 3B

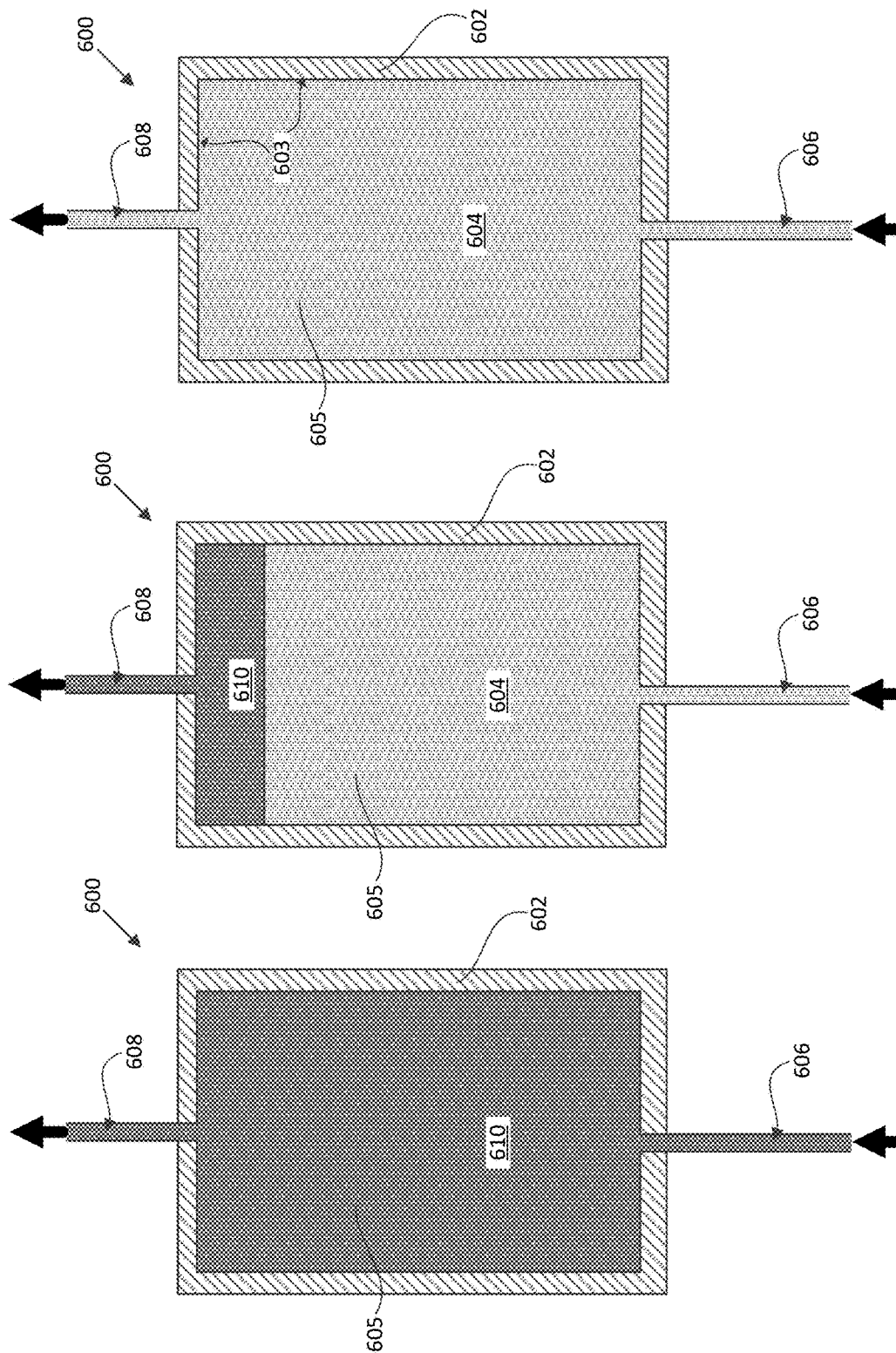

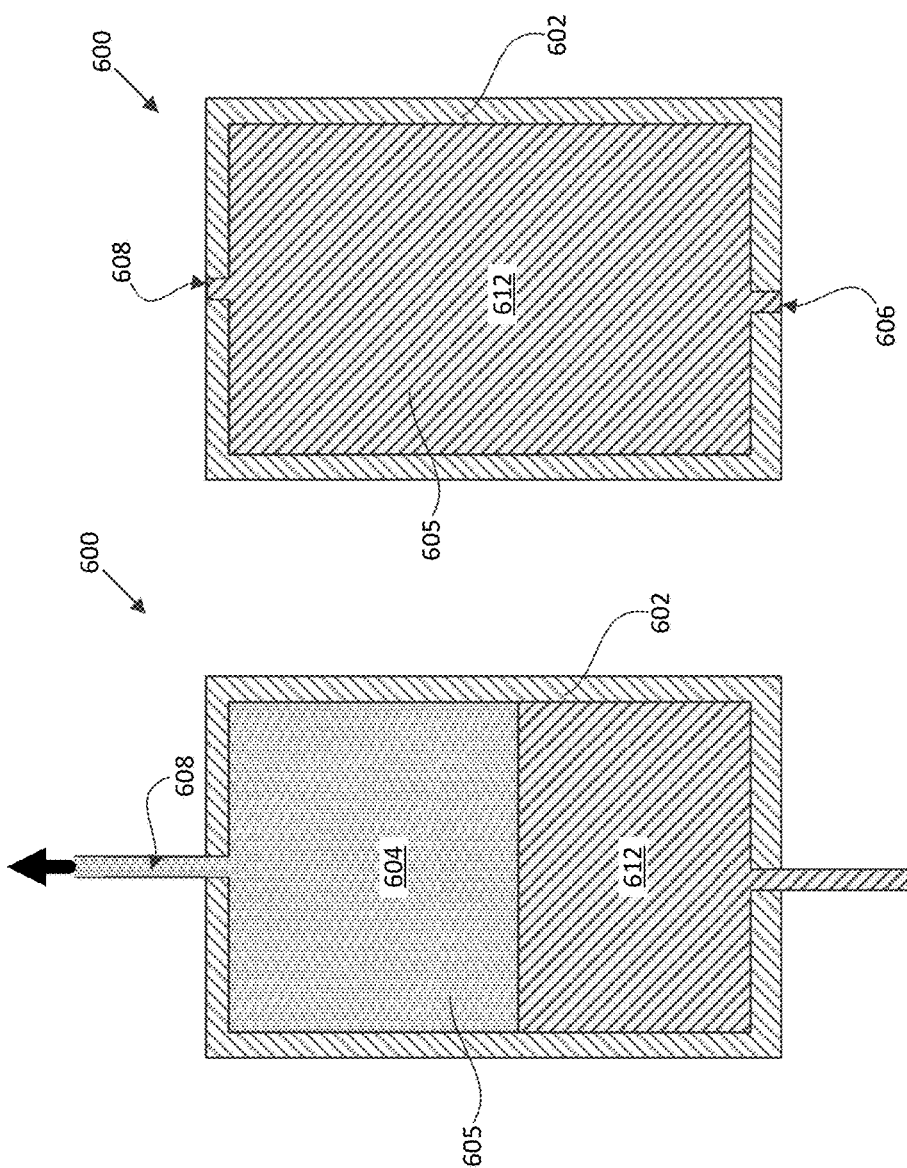

OZONE ADHESION PROCESS FOR INSULATING CONTAINER MANUFACTURE

CROSS-REFERENCE TO RELATED APPLICATION

The present application is a continuation-in-part of U.S. application Ser. No. 14/665,494, filed Mar. 23, 2015. The content of the above noted application is hereby incorporated by reference in its entirety for any and all non-limiting purposes.

BACKGROUND

An insulating container, or device, may be configured to reduce a rate heat transfer through one or more surfaces. As such, a structure of an insulating container may be molded from a polymer. Moreover, the molded structure may comprise one or more cavities configured to be filled with an additional insulating material, such as a foam. Aspects of this disclosure relate to improved methods for production of an insulating container having one or more cavities configured to be filled with an additional insulating material.

BRIEF SUMMARY

According to one aspect, a method of manufacturing an insulating container may mold an external structure of the insulating container from a polymer. The insulating container may include an inner trough, an outer shell that is connected to the inner trough by a top edge surface, and an internal cavity between the inner trough and the outer shell. A first opening may extend into the internal cavity at a first corner of a base surface of the outer shell. Further, the second opening may extend into the internal cavity at a second corner of the base surface that is opposite the first corner. The method may position the external structure of the insulating container with the second opening above the first opening, and inject ozone gas containing 5-7.5%, or 1-15% ozone into the first opening. The method may further fill the cavity with the ozone gas, thereby displacing a mass of air out through the second opening. The method may additionally flush the cavity with air to remove the ozone gas, and fill the cavity with an insulating foam.

In another aspect, a method for producing an insulating structure may mold an outer shell of an insulating structure from a polymer. The outer shell may have an internal cavity, a first opening extending into the internal cavity, and a second opening extending into the internal cavity. The method may further position the outer shell of the insulating structure with the second opening above the first opening, and inject an ozone gas containing 5-7.5%, or 1-15% ozone into the first opening. The method may fill the cavity with the ozone gas to displace a mass of air out through the second opening. The method may further flush the cavity with air to remove the ozone gas from the cavity, and fill the cavity with an insulating foam.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and not limited in the accompanying figures in which like reference numerals indicate similar elements and in which:

FIGS. 2A-2D schematically depict an insulating container that may be utilized with the systems and methods described herein for achieving improved adhesion between a molded polymeric surface and an insulating material configured to fill a cavity of the insulating container, according to one or more aspects described herein.

FIGS. 3A-3B schematically depict an insulating structure, according to one or more aspects described herein.

FIGS. 4A-4B schematically depict an insulating structure, according to one or more aspects described herein.

FIGS. 6A-6H schematically depict different stages of a process for improving adhesion of an insulating foam to one or more molded polymeric surfaces, according to one or more aspects described herein.

Further, it is to be understood that the drawings may represent the scale of different component of one single embodiment; however, the disclosed embodiments are not limited to that particular scale.

DETAILED DESCRIPTION

Aspects of this disclosure relate to systems and methods for production of an insulating container, or device, such that improved adhesion between one or more molded polymeric surfaces of a structure of the insulating container and an additional insulating material configured to be filled into one or more cavities of the structure of the insulating container may be achieved.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure.

Figure 1:
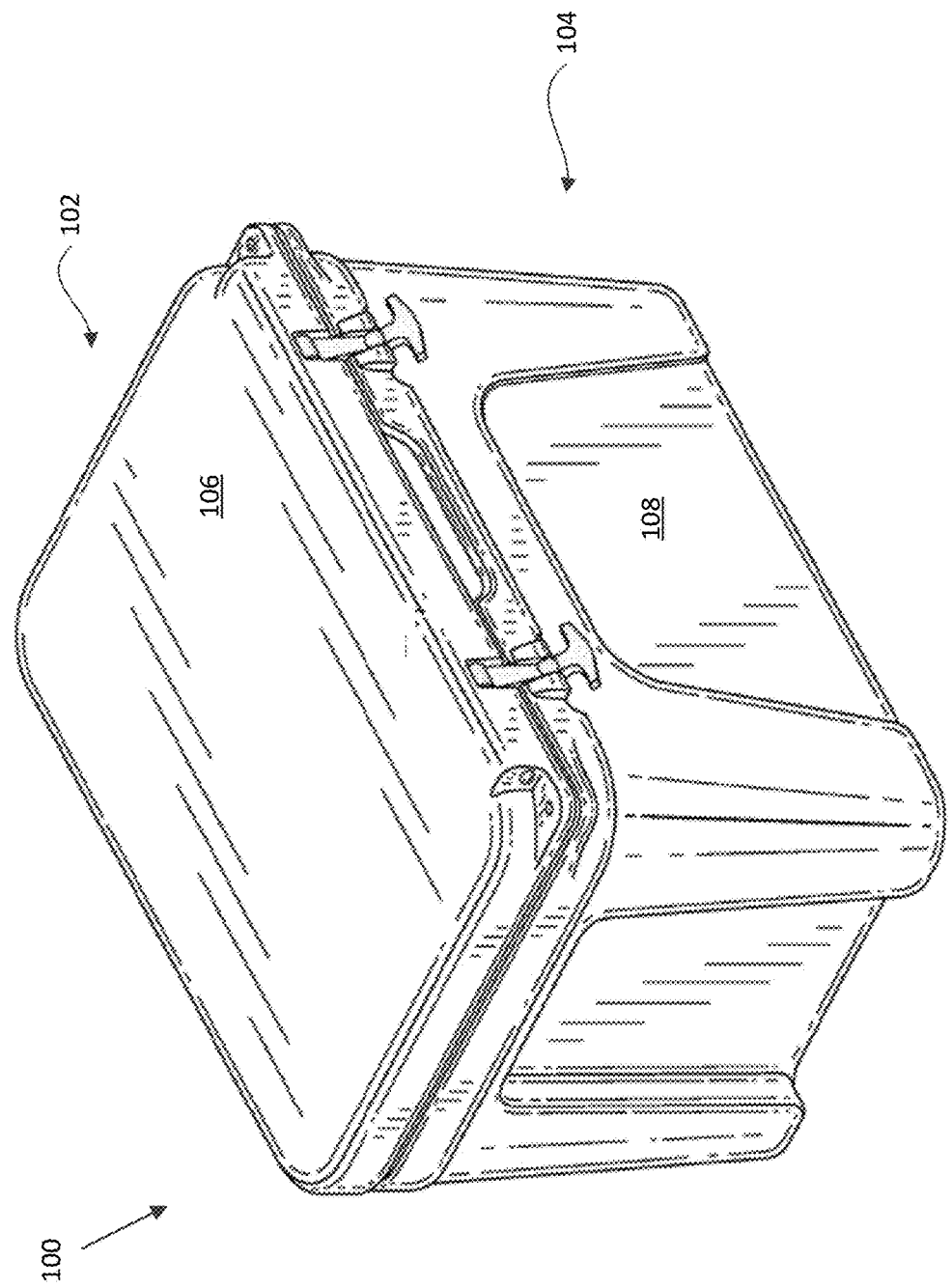
FIG. 1 depicts an isometric view of an example of an insulating container, according to one or more aspects described herein.

FIG. 1 depicts an isometric view of one example of an insulating container 100, according to one or more aspects described herein. In particular, the insulating container 100 may be described as a "cooler" device, having a lid structure 102 and base structure 104. In one example, the insulating container 100 may be configured to reduce a rate of heat transfer to/from an internal storage compartment (not shown in FIG. 1). In one example, the lid structure 102 may be hinged relative to the base structure 104 to gain access to the internal storage compartment (not depicted).

The insulating container 100 may have one or more structural elements configured to increase a thermal resistance of the container 100. As such, the insulating container 100 may be molded from one or more polymers. In this way, load-bearing structures of the insulating container 100 may be formed from one or more molded polymers. In one example, utilizing one or more polymers to form the structural elements of insulating container 100 may offer the advantage of comparatively higher thermal resistivity properties exhibited by polymers, when compared to, for example, metals or alloys. Accordingly, an outer shell 106, otherwise referred to as an external structure 106, of the lid 102 may be molded from one or more polymers. Similarly, the outer shell 108, otherwise referred to as the external structure 108, of the base structure 104, may be molded from a same, or a different, one or more polymers.

In one implementation, the insulating container 100 may represent one example of a device that may be utilized with the systems and methods described herein in order to achieve improved adhesion between a molded polymeric surface and an additional insulating material configured to fill an internal cavity of the insulating container or device 100. As such, the relative dimensions of container 100, in addition to the various depicted geometrical features of container 100 are not specific or integral to the systems and methods described herein. As such, the systems and methods described herein may be utilized with any insulating device structure that is molded from a polymer, and that has one or more internal cavities configured to be filled with an additional insulating material that is further configured to be adhered to a surface of a molded polymer structure.

FIGS. 2A-2D schematically depict an insulating container 200 that may be utilized with the systems and methods described herein for achieving improved adhesion between a molded polymeric surface and an insulating material configured to fill a cavity. In one example, the insulating container 200 may be a schematic representation of a base structure of a cooler device, such as base structure 104 of device 100 depicted FIG. 1. Accordingly, in one example, FIG. 2A schematically depicts a plan view of the insulating container 200, FIG. 2B schematically depicts a front elevation view of the insulating container 200, FIG. 2C schematically depicts a view of a bottom of the insulating container 200, and FIG. 2D schematically depicts an end elevation view of the insulating container 200. In one example, the structures schematically depicted in FIGS. 2A-2D may be formed from one or more molded polymers, and may include an inner trough structure 202, otherwise referred to as a cavity 202. As such, the inner trough structure 202 may be bounded by that inner wall labeled as element 208. The container 200 may further comprise an outer shell structure labeled as element 206. Accordingly, the outer shell 206 may be coupled to the inner wall 208 of the inner trough structure 202 by a top edge surface 204. As such, an internal cavity 210 may be formed between the outer shell 206 and the inner wall 208 of the inner trough structure 202. In one implementation, the internal cavity 210 may be substantially enclosed, and such that the only openings into the internal cavity are through openings 212-218 on a base surface 220 of the insulating container 200.

In one example, the insulating container 200 may be formed from a molded polymer. In this way, the molded polymer may offer a comparatively lower thermal conductivity than other structural materials (e.g. metals or alloys). As such, this comparatively lower thermal conductivity may be desirable in order to reduce a rate of heat transfer to or from the inner trough structure 202 from/to an outside environment. Additionally, the insulating container 200 may comprise one or more voids, or cavities, configured to be filled with one or more additional insulating materials. In one example, the internal cavity 210 may be configured to be filled with an additional insulating material. As such, in one implementation, this additional insulating material may exhibit higher thermal resistivity properties than the polymer used to mold the structural elements (e.g. elements 202, 204, 206, 208) of the insulating container 200. In this way, a material that exhibits higher thermal resistivity, but may be unsuitable for construction of structural elements due to less favorable mechanical properties (e.g. comparatively lower mechanical strength and rigidity than a molded polymer) may be utilized in conjunction with the molded polymer used to construct the structural elements of insulating container 200. The resulting structure of an insulating device, such as container 200, may be a compound, or composite, having a combination of high mechanical strength and rigidity and high thermal resistivity.

In one example, the internal cavity 210 may represent multiple cavities separated one or more by internal structures (e.g. ribs, baffles, flanges, or other structural elements). As such, the internal cavity 210 may comprise multiple discrete cavities. As such, in one implementation, multiple discrete cavities represented by the internal cavity 210 may be connected to one another by smaller openings. In another example, the internal cavity 210 may be one continuous cavity.

In one specific example, the insulating container 200 may be formed from polyethylene. In another implementation, the systems and methods described herein may be utilized with additional or alternative polymers. For example, the insulating container 200 may utilize polytetrafluoroethylene, polymethylmethacrylate, polypropylene, polyvinyl chloride, polyethylene terephthalate, polystyrene, polycarbonate, or polyurethane. Further, the internal cavity 210 may be configured to be filled (100% filled) with an insulating foam, and such that the insulating foam is configured to adhere to one or more surfaces of the cavity 210. In one example, the insulating foam may comprise a polymeric foam. In one specific example, the insulating foam may be polyurethane. However, in another example, additional or alternative insulating materials may be utilized to fill, and adhere to one or more surfaces of the internal cavity 210, without departing from the scope of the disclosures described herein. As such, the internal cavity 210 may be configured to be filled with polystyrene foam, polyvinyl chloride foam, or polyimide foam, among many others. As such, in one example, a polymer used to mold the various structural elements of the insulating container 200 may have a first thermal resistivity, and an additional insulating material used to fill the internal cavity 210 may have a second thermal resistivity, higher than the molded polymer. In yet another implementation, the internal cavity 210 may be filled with another insulating material that is configured to adhere to one or more molded polymeric surfaces of the internal cavity 210. For example, a mix of polymer flakes, or pellets, in addition to a binding material (adhesive) may be injected into the internal cavity 210.

In one example, the internal cavity 210 may be partially filled with an insulating material, such as an insulating foam (polyurethane foam). As such, filling the internal cavity 210 may refer to injecting insulating foam such that the internal cavity 210 may be 80% filled, 85% filled, 90% filled, 95% filled, 97% filled, 99% filled, 99.7% filled, or 99.9% filled, among others.

In one implementation, specific thermal properties of the insulating container 200 will depend upon the specific dimensions of the structure 200 (e.g. one or more surface areas), as well as upon the thicknesses of the molded polymeric structures (e.g. thicknesses of inner wall 208 of the trough structure 202, and the thickness of outer shell 206), as well as one or more thicknesses of the internal cavity 210 (hence the thickness of the additional insulating material filled into the internal cavity 210).

In one implementation, the insulating container 200 may be manufactured using one or more rotational molding processes for molding a polymer. As such, those of ordinary skill in the art will recognize various details of a rotational molding processes that may be utilized with the systems and methods described herein without departing from the scope of the disclosures described herein. In another example, the insulating container 200 may be manufactured using one or more additional or alternative molding processes. As such, the insulating container 200 may be molded from one or more polymers using an injection molding process, among others. Furthermore, the insulating container 200 may be further processed using one or more additional manufacturing processes, including, among others, drilling and deburring, cutting, and sanding, without departing from the scope of the disclosures described herein. As depicted in FIGS. 2A-2D, the insulating container 200 may be embodied with a substantially cuboidal shape. However, in other implementations, the insulating container 200 may be embodied with additional or alternative geometries (e.g. circular, prismoidal, among others), without departing from the scope of these disclosures.

In one example, a molded polymer, such as a molded polyethylene, may exhibit hydrophobic surfaces due to the nature of the chemical bonds of the polyethylene. In contrast, an adhesive may commonly be hydrophilic. As such, it may be difficult to adhere a material, such as an insulating foam, to a hydrophobic surface of a molded polymer structure, such as one or more surfaces of the internal cavity 210. In this way, debonding, or delamination may occur between one or more internal surfaces of the internal cavity 210 and an insulating material configured to fill the internal cavity 210. As such, a void, or air pocket may form as a result of delamination of one or more of the internal surfaces of the internal cavity 210 from an insulating material configured to fill the internal cavity 210, and may diminish a thermal resistivity offered by the insulating container 200.

In order to improve adhesion to one or more surfaces of an insulating container, and in particular, to improve adhesion between one or more internal surfaces of the internal cavity 210, and an insulating foam configured to fill the cavity 210, one or more processes may be utilized to introduce ozone gas into the cavity 210 during production of the insulating container 200. Accordingly, one or more processes for improving adhesion to a molded polymer surface of the insulating container 200 are described in further detail in relation to FIG. 5.

FIGS. 3A-3B schematically depict an insulating structure 300. In one implementation, FIG. 3A schematically depicts a plan view of the insulating structure 300, and FIG. 3B schematically depicts a front elevation view of the insulating structure 300. In one example, the insulating structure 300 may be utilized with the systems and methods described herein for achieving improved adhesion between a molded polymeric surface, and an additional insulating material. In one implementation, the insulating structure 300 may be a schematic representation of a lid structure of an insulating container, such as lid structure 102 of insulating container 100 from FIG. 1.

In one example, the insulating structure 300 may be manufactured from a molded polymer, and have a molded polymeric outer shell 302. In one specific example, and similar to the insulating container 200, the insulating structure 300 may be molded from polyethylene. In one implementation, the outer shell 302 may encase an internal cavity 304. As such, and in a similar manner to the internal cavity 210 of the insulating container 200, the internal cavity 304 may be configured to be filled with an insulating material. In one specific example, the internal cavity 304 may be configured to be filled with polyurethane insulating foam. As such, the same considerations with regard to molding processes, as well as those considerations with regard to adhesion of an insulating foam to one or more molded polymeric internal surfaces of the internal cavity 304, may be applicable to the insulating structure 300, as discussed in relation to the insulating container 200.

It will be appreciated that while the specific thermal resistivity properties of the insulating structure 300 will be dependent upon specific dimensions of the structure 300 (e.g. dependent upon surface areas and thicknesses), the systems and methods described herein may be utilized with an insulating structure 300 having any dimensional values. Indeed, it should be understood that the depicted implementations of the insulating structure 300 from FIGS. 3A and 3B should not be construed as being limited to the depicted relative sizes of the various geometrical features of the insulating structure 300. As such, the insulating structure 300 may have additional or alternative geometrical features to those depicted in FIGS. 3A and 3B, without departing from the scope of the disclosures described herein in relation to systems and methods for improving adhesion between one or more molded polymeric surfaces of an internal cavity of an insulating structure, and an additional insulating material (e.g. insulating foam). Furthermore, the insulating structure 300 should not be construed as being limited to a lid of a cooler structure, such as lid 102, and that the lid structure is merely one example implementation of the insulating structure 300. As depicted in FIGS. 3A-3B, the insulating structure 300 may be embodied with a substantially cuboidal shape. However, in other examples, the insulating structure 300 may be embodied with additional or alternative geometries (e.g. circular, prismoidal), without departing from the scope of these disclosures.

In one example, internal cavity 304 of the insulating structure 300 may be substantially enclosed by the molded polymeric outer shell 302. Accordingly, in one implementation, the internal cavity 304 may be accessible through openings 306 and 308. In the exemplary implementation of the insulating structure 300 from FIGS. 3A-3B, the openings 306 and 308 may be on a same side of the structure 300. In one example, openings 306 and 308 may be on different sides of the structure 300. Additionally or alternatively, the insulating structure 300 may be embodied with more than those to openings 306 and 308, without departing from the scope of the disclosures described herein. In one example, an insulating foam may be configured to be introduced into the internal cavity 304 through one or more of the openings 306 and 308.

FIGS. 4A-4B schematically depict an insulating structure 400. In one implementation, FIG. 4A schematically depicts a plan view of the insulating structure 400, and FIG. 4B schematically depicts a front elevation view of the insulating structure 400. In one example, the insulating structure 400 may be similar to the insulating structure 300 depicted in FIGS. 3A-3B. In this way, the insulating structure 400 may have a molded polymeric outer shell 402 encasing an internal cavity 404 that is configured to be filled with an insulating foam.

In one implementation, the insulating structure 400 is manufactured with those same considerations described in relation to the insulating container 200 from FIGS. 2A-2D, as well as the insulating structure 300 from FIGS. 3A-3B. As such, a process for improving adhesion between one or more internal surfaces of the internal cavity 404, and an insulating foam configured to fill the internal cavity 404, may be utilized with the insulating structure 400. As will be described in further detail in relation to FIG. 5, a process for improving adhesion to a molded polymer surface of the internal cavity 404 may include introducing ozone gas into the internal cavity 404 through one of the openings 406 or 408, and displacing air entrained within the internal cavity 404 through the other of the openings 406 or 408. Accordingly, in one implementation, the internal cavity 404 may be embodied with internal baffles 410 and 412 in order to improve distribution of the ozone gas in the internal cavity 404. However, in one implementation, baffles 410 and 412 are merely schematic representations of baffle structures that may be utilized within the internal cavity 404. As such, different geometries of the insulating structure 400, and the internal cavity 404, may be utilized without departing from the scope of these disclosures.

Figure 5:
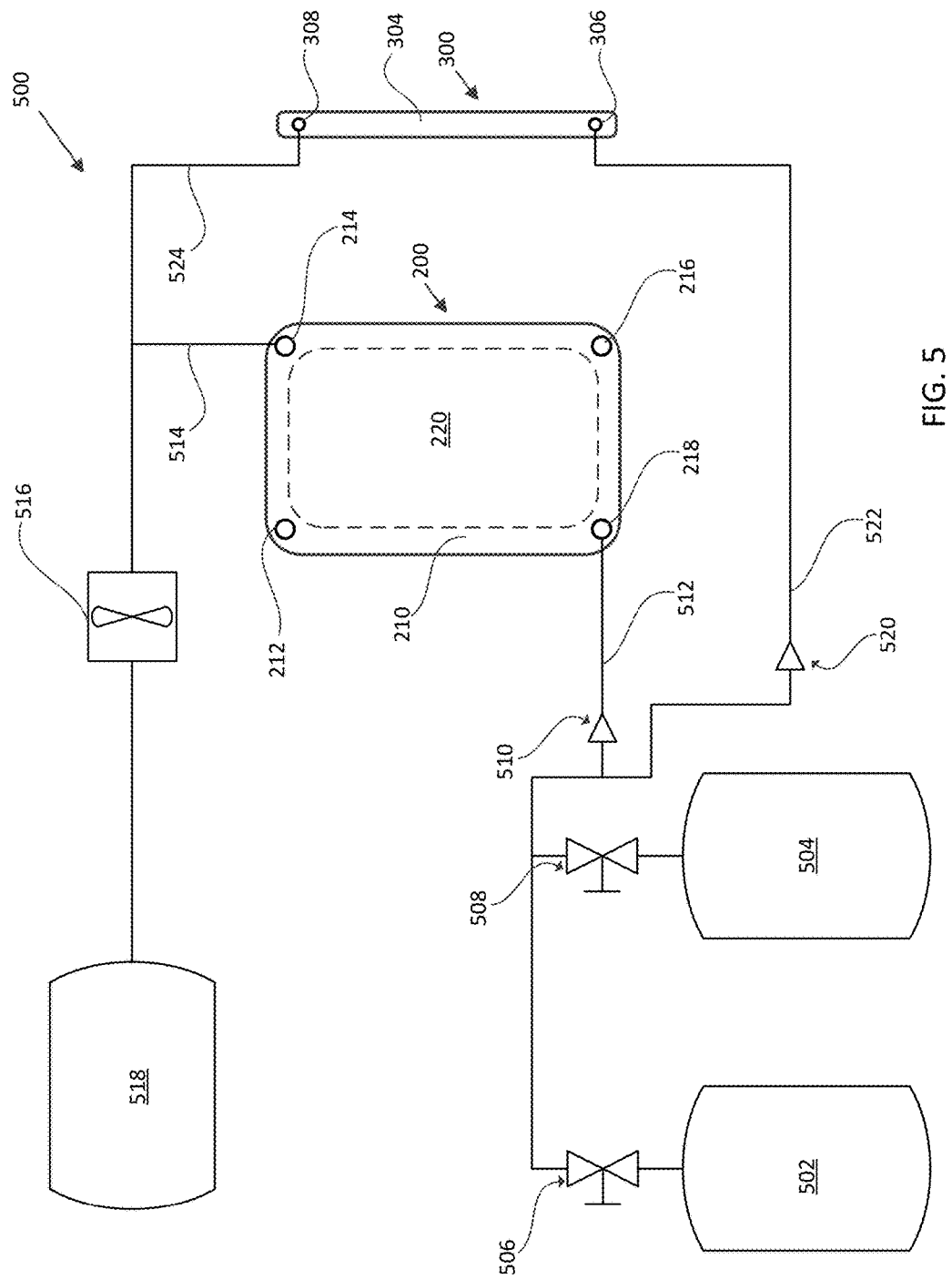
FIG. 5 schematically depicts a system for improving adhesion of an insulating foam to one or more molded polymeric surfaces, according to one or more aspects described herein.

FIG. 5 schematically depicts a system 500 for improving adhesion of an insulating material to one or more molded polymeric surfaces. In particular, system 500 may be utilized to improve adhesion of an insulating foam to one or more molded polymeric surfaces of an internal cavity of an insulating container 200 and/or an insulating structure 300. In one implementation, system 500 may be utilized to provide surface functionalization for one or more molded polymeric surfaces of one or more of internal cavity 210 and/or internal cavity 304. As such, system 500 may be utilized after the insulating container 200 or the insulating structure 300 has been molded, but prior to introduction of an insulating foam into one or more of internal cavities 210 and/or 304.

In one implementation, a process for surface functionalization of a molded polymeric surface for improvement of adhesion between said surface and an insulating material (e.g. an insulating foam) may involve introduction of an ozone gas into a cavity (e.g. cavity 210 and/or 304). In one implementation, element 502 may be an ozone gas source. Accordingly, the ozone gas source 502 may be provided by a commercially-available ozone generator device. In one example, the ozone gas reservoir 502 may be configured to output ozone gas having a concentration of approximately 5-7.5% ozone (trioxygen) (e.g. approximately 5-7.5% ozone, and approximately 92.5-95% oxygen), and the like. In another example, the ozone gas source 502 may, alternatively, be configured to output ozone gas having a concentration of approximately 5-7.5% ozone combined with a mixture of gases that include oxygen, as well as other constituent/contaminant gases that make up the balance of the total gas concentration (e.g. nitrogen, carbon dioxide, and the like). Further, in yet another example, the ozone gas reservoir 502 may be configured to output ozone gas having other concentrations of ozone, such as approximately 4-9% ozone, 3-10% ozone, or 1-15% ozone. In one example, the ozone gas may have a concentration of at least 1% ozone, or at least 1.9% ozone. In another example, the ozone gas may have a concentration of approximately 1.9% ozone, or 1.8-2.0% ozone. Element 506 may represent a valve configured to control an output flow from the ozone gas source 502. Those of ordinary skill in the art will recognize specific valve mechanisms that may be utilized at valve 506 with specific consideration for handling of ozone gas, without departing from the scope of these disclosures. In one implementation, the ozone gas source 502 may be pressurized to various pressure levels. In one example, an output pressure from ozone gas source 502 may be approximately equal to 0.5 psi (approx. 3400 Pa) (gauge pressure). In another example, an output pressure from the ozone gas source 502 may range from approximately 0.1 psi or less to approximately 0.8 psi or more. In one example, oxygen gas may be provided to the ozone gas source 502 in order to generate a concentration of ozone gas to be delivered to the input line 512 (e.g. to generate ozone gas having a concentration of approximately 5-7.5% ozone). As such, in one example, oxygen gas may be provided to the ozone gas source 502 at approximately 20 to 30 psi (approximately 137-206 kPa). In one implementation, an output flow rate from the ozone gas source 502 may be equal to approximately 60 liters per minute. In another implementation, an output flow rate from the ozone gas source 502 may be equal to approximately 110 liters per minute. In other examples, an output flow rate of ozone gas from the ozone gas source 502 may have different flow rates (e.g. 30 liters per minute, 20 liters per minute, or a flow rate ranging from approximately 1 liter per minute to approximately 200 liters per minute, among others), without departing from the scope of these disclosures.

System 500 may further utilize a gas source 504. Accordingly, in one implementation, gas source 504 may comprise an air source. As such, in one example, the air source 504 may comprise an air compressor configured to provide air at a pressure above atmospheric pressure. In another example, air source 504 may output an air flow driven by a fan, and the like. Accordingly, in one implementation, air source 504 may provide air at any pressurization above atmospheric pressure (e.g. a gauge pressure ranging from 5 psi to 120 psi, among others). Further, valve 508 may be configured to control an output of pressurized air from source 504. In one example, valve 508 may be embodied with a mechanism configured to accommodate pressurized gas (e.g. pressurized air). As such, those of ordinary skill in the art will recognize specific valve mechanisms that may be utilized with valve 508, without departing from the scope of these disclosures. In one example, valves 506 and 508 may be mechanically or electronically actuated, and may be automated, or manually operated. In one example, valves 506 and 508 may be configured such that when one of the valves 506 and 508 is open, the other is closed, and the like.

In one implementation, source 504 may be configured to output a pressurized gas other than air. In one example, source 504 may output an inert gas at a pressurization above atmospheric pressure (e.g. helium, argon gas, and the like). In another example, source 504 may be configured to output nitrogen gas.

In one example, system 500, and in particular, valves 506 and 508, valves 510 and 520, and fan 515, may be computer-controlled. In this way, a non-transitory computer-readable medium comprising computer-executable instructions may be executed by a processor to actuate one or more of valves 506 and 508, valves 510 and 520, and fan 515 to execute a process (e.g. process 700 from FIG. 7)

In one example, system 500 may be configured to introduce a mass of ozone gas into the internal cavity 210 of the insulating container 200 and/or the internal cavity 304 of the insulating structure 300 (and/or insulating structure 400, not depicted in FIG. 5). Taking, in a first example, the insulating container 200; ozone gas may be introduced into the internal cavity 210 through a first opening 218 from input line 512. Accordingly, the insulating container may be oriented such that a second opening 214 is above the first opening 218 (in one example the second opening 214 may be vertically above, or otherwise at a higher elevation than the first opening 218). In one implementation, gas may be configured to escape from the internal cavity 210 through the second opening 214 into the output line 514. In this example, openings 212 and 216 of the insulating container 200 may be sealed as ozone gas is injected into opening 218. In one example, the systems and methods described herein may be utilized to inject a mass of ozone gas into the internal cavity 210 of the insulating container 200 through, in another implementation, opening 216 in base surface 220. Further, gas may be configured to escape from the internal cavity 210 through a second opening corresponding to opening 214 or 212. Accordingly, either opening 216 or 218 may be utilized to inject ozone gas into the internal cavity 210 and either opening 212 or 214 may be used to allow gas to escape from the internal cavity 210. In the depicted example, only one of openings 216 and 218 may be utilized to inject ozone gas into the internal cavity 210, and the other of the openings 216 and 218 may be sealed. Similarly, only one of the openings 212 and 214 may be used to allow gas to escape from the internal cavity 210, and the other of the openings 212 and 214 may be sealed.

In one implementation, the first opening 218 (or 216) may be adjacent to a bottom portion of the internal cavity 210 and the second opening 214 (or 212) may be adjacent to a top portion of the internal cavity 210, and such that the relative terms "bottom" and "top" are defined relative to an orientation of the insulating container 200 having the second opening 214 above the first opening 218. Further, in one implementation, the first opening 218 may be adjacent to a bottom sidewall of the outer shell structure 206 and the second opening 240 may be adjacent to a top sidewall of the outer shell structure 206.

In one example, in order to improve distribution of the ozone gas throughout the internal cavity 210, the opening (216 or 218) through which the ozone gas is injected into the internal cavity 210 may be at an opposite corner of the base surface 220 to that opening (212 or 214) through which gas from the internal cavity 210 may escape. In another implementation, an input opening (216 or 218) may be on a same side of the base surface 220 as an output opening (212 or 214). In another example, those of ordinary skill in the art will recognize that one or both of the openings 216 and 218 may be utilized to input ozone gas into the internal cavity 210, and/or one or both of openings 212 and 214 may be utilized to allow gas from the internal cavity 210 to escape to output line 514. In another implementation, the insulating container 200 may be configured with fewer than, or more than those four openings 212-218, without departing from the scope of these disclosures. In one example, for an insulating container 200 having a substantially rectangular base surface 220, system 500 may position the insulating container 200 such that a longer length of the base surface 220 has a substantially vertical orientation.

Input line 512 and output line 514 are depicted in system 500 as schematic pipework elements. Furthermore, system 500 may include specific elements in addition to/as alternatives to those elements depicted in system 500. In one implementation elements 512 and 514 may comprise one or more materials and/or geometries that may be utilized to handle ozone gas from the ozone gas reservoir 502 and/or air from the air source 504 at a given flow rate, concentration, or pressurization, and without departing from the scope of these disclosures. In one example, a valve 510 is depicted on input line 512. Accordingly, valve 510 may represent one or more safety/other operational elements (e.g. pressure regulators, flowmeters, gas leak detection elements, manifolds, among others) that may be introduced into system 500 in order to facilitate injection of ozone gas into the internal cavity 210.

In a similar manner to the insulating container 200, system 500 may, additionally or alternatively, be utilized to functionalize one or more surfaces of an internal cavity 304 of the insulating structure 300. As such, system 500 may be utilized to introduce ozone gas into the internal cavity 304 through a first opening 306 from an input line 522. In one example, gas may be configured to escape from the internal cavity 304 through a second opening 308, and out to an output line 524. In one implementation, the second opening 308 may be above (vertically above, or otherwise at a higher elevation than) the first opening 306. Similar to input line 512 and output line 514, input line 522 and output line 524 are schematic representations of hardware that may be utilized with system 500. As such, input line 522 and output line 524 may be configured with any dimensions and materials appropriate for a given flow rate, pressurization, and/or gas concentration to be injected into the internal cavity 304 through the first opening 306, and out through the second opening 308. In one example, valve 520 may represent one or more components configured to monitor, regulate, or provide one or more safety features to facilitate gas injection (from ozone gas reservoir 502 and/or air source 504) into insulating structure 300. In one example, elements 510 and 520 may be utilized to regulate/adjust a pressure and/or flow rate into one or more of the internal cavities 210 and 304. Accordingly, in one example, a pressure and/or flow rate of gas injected into one or more of the internal cavities 210 and 304 may be varied based upon a volume and/or surface area of the internal cavities 210 and 304. One or more processes for improving adhesion of an insulating foam to one or more molded polymeric surfaces using system 500 are described in relation to FIG. 6 and FIG. 7.

In one example, system 500 may include one or more fans 516 configured to draw gas out of the second openings 214 and 308. In another example, system 500 may not include fan 500, and such that gas is urged out through output lines 514 and 524 as a result of a higher pressure level within cavities 210 and 304. Further, in one example, output lines 514 and 524 may apply a back pressure (i.e. a pressure above atmospheric pressure) to the second openings 214 and 308. In one implementation, a back pressure at the openings 214 and 308 may range from approximately 0.01 psi (approximately 68 Pa) (gauge pressure) to approximately 7 psi (approximately 48 kPa) (gauge pressure). However, those of ordinary skill in the art will recognize that a back pressure applied at opening 212 and/or 308 may vary based upon downstream elements in system 500, such as dimensions (length and bore) of output lines 514 and 524, among others. In one example, a back pressure at openings 214 and 308 may be utilized to provide for improved distribution of a gas injected into internal cavities 210 and 304.

In one implementation, system 500 may include container 518 configured to store or otherwise process a mass of gas released from one or more of internal cavities 210 and 304. In one example, the container 518 may be configured to store a mass of gas released from the internal cavities 210 and 304 for further treatment. As such, in one example, container 518 may include one or more devices configured to treat ozone gas (decompose ozone gas back into oxygen, and the like). Further, container 518 may represent one or more devices configured to facilitate cleaning/further sanitization of gas released from cavities 210 and/or 304 before being released to the atmosphere, and the like.

In one example, system 530 represents a schematic system that may be utilized to improve adhesion of an insulating foam to one or more molded polymeric surfaces. As such, system 500 may be scaled such that it may be utilized to accommodate a plurality of insulating containers 200 or insulating structures 300 above and beyond that single insulating container 200 and single insulating structure 300 depicted in FIG. 5. Further, those of ordinary skill in the art will recognize various additional safety containment elements that may be utilized with system 500 to prevent exposure of human users to the ozone gas associated with ozone gas source 502, without departing from the scope of the disclosures described herein.

FIGS. 6A-6H schematically depict different stages of a process for improving adhesion of an insulating foam to one or more molded polymeric surfaces. In particular, FIGS. 6A-6H schematically depict an insulating container 600 that may be similar to insulating container 200, insulating structure 300, and/or insulating structure 400. As such, insulating container 600 may comprise a molded polymeric outer shell 602 having molded polymeric surfaces 603 encasing an internal cavity 605, similar to internal cavities 210, 304, and 404. Additionally, insulating container 600 may be configured with a first opening 606 and a second opening 608 into the internal cavity 605. As such, the second opening 608 may be positioned above (vertically above or otherwise at a higher elevation than) the first opening 606. In one example, the first opening 606 may correspond to the first opening 218 of insulating container 200 or the first opening 306 of the insulating structure 300. Similarly, the second opening 608 may correspond to the second opening 214 of insulating container 200 or the second opening 308 of the insulating structure 300. In one example, a volume of the internal cavity 605 may be equal to approximately 15 L. In another example, a volume of the internal cavity 605 may be equal to approximately 20 L. in yet another example, a volume of the internal cavity 605, may range from approximately 2 liters or less to approximately 1000 liters or more. Indeed, the systems and methods described herein may be utilized with an internal cavity 605 of any volume.

Figure 6C:
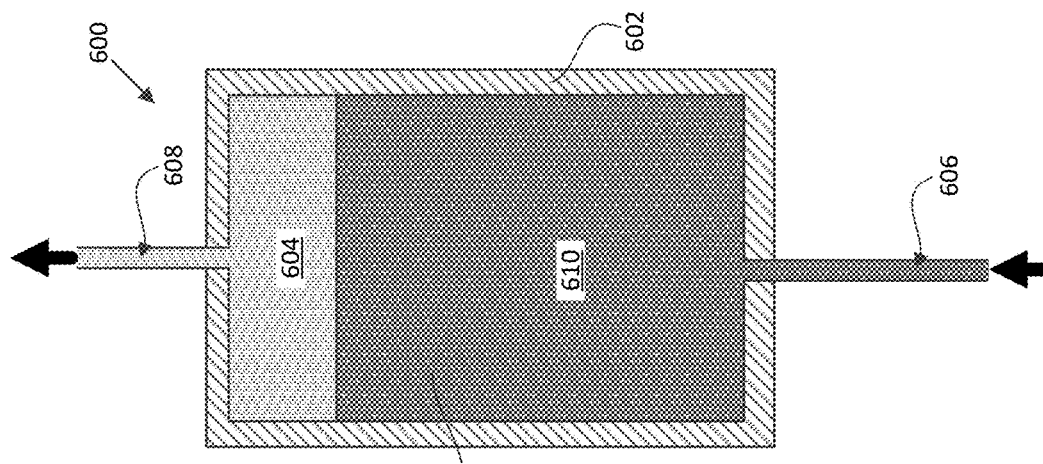
Figure 6B:
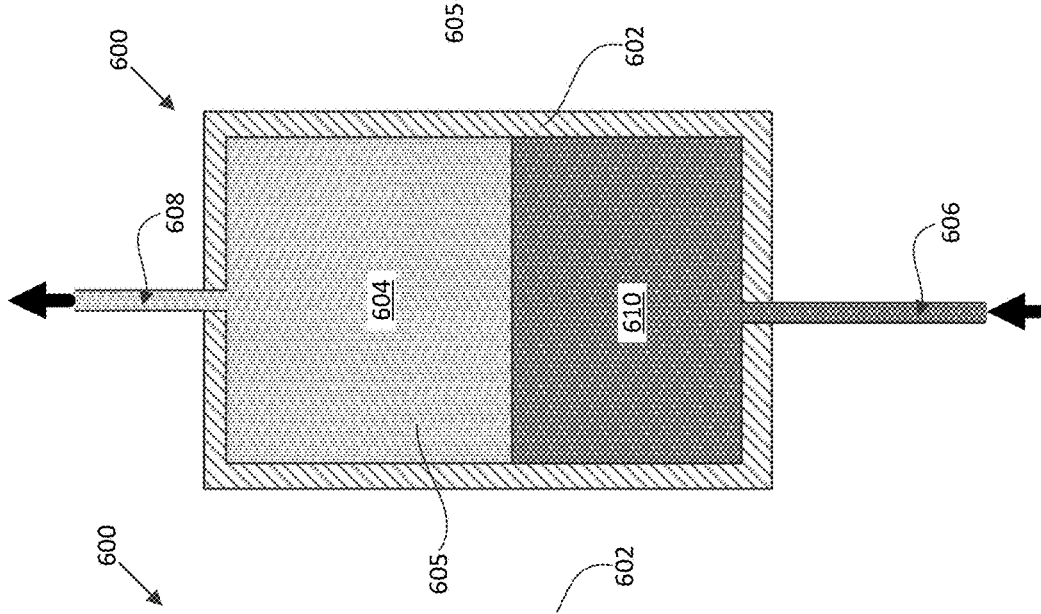
Figure 6A:
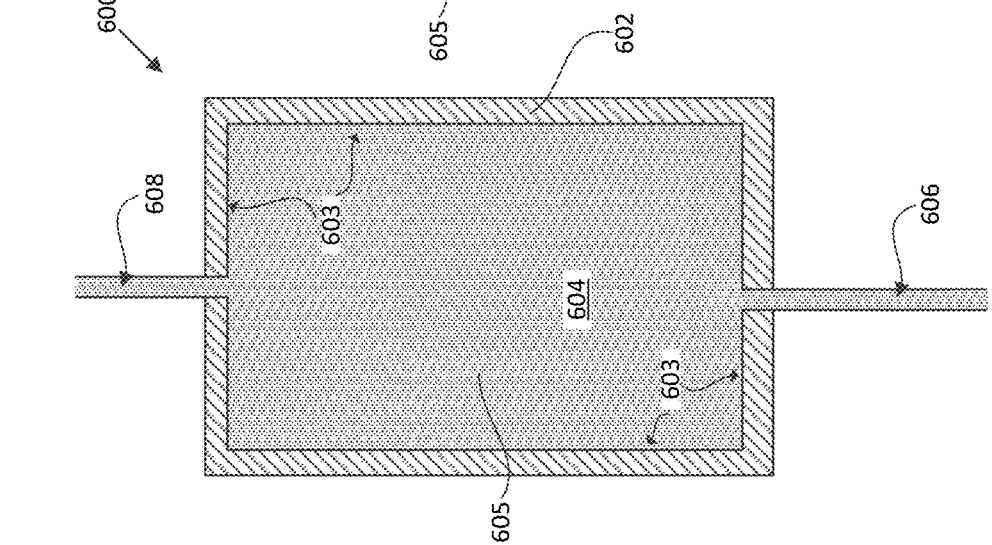

FIG. 6A represents a first point during a process for improving adhesion of an insulating foam (not pictured in FIG. 6A) to one or more molded polymeric surfaces 603 of a molded polymeric outer shell 602. Accordingly, FIG. 6A schematically represents a stage of production of an insulating container 600 after a molding process (e.g. rotational molding of polyethylene) has been utilized to mold the outer shell 602, but before insulating foam (not depicted in FIG. 6A) has been injected into the internal cavity 605. As such, the internal cavity 605 may be filled with a mass of air 604 that may infiltrate the internal cavity 605 from the surrounding atmosphere through one or more of openings 606 and 608. In one implementation, the internal cavity 605 may be filled with another type of gas (other than air 604) from a surrounding environment (e.g. an inert gas used in a manufacturing environment, and the like).

FIG. 6B schematically depicts a second point during a process for improving adhesion of an insulating foam to one or more molded polymeric surfaces 603 of a polymeric outer shell 602. Accordingly, in one example, a mass of ozone gas 610 may be introduced into the internal cavity 605. As such, FIG. 6B schematically depicts a mass of ozone gas 610 being injected through the first opening 606, and partially filling the internal cavity 605. Accordingly, as a mass of ozone 610 is being injected into the internal cavity 605, the mass of air 604 is displaced (molecular weight of ozone is greater than that of air) out through the second opening 608. As such, as a mass of ozone 610 injected into the internal cavity 605 increases, a mass of air 604 contained within the internal cavity 605 decreases. This is schematically represented as a discrete boundary between the ozone gas 610 on air 604 in FIG. 6B. However, those of ordinary skill in the art will recognize that as ozone gas 610 is injected into the internal cavity 605, various complex currents may exist within the internal cavity, and such that a clear delineation/interface between the mass of ozone gas 610 and the mass of air 604 may not exist, contrary to that schematic depiction in FIG. 6B.

In one example, the mass of ozone gas 610 injected into the internal cavity 605 may have a concentration of approximately 5-7.5% ozone (trioxygen) (e.g. approximately 5-7.5% ozone, and approximately 92.5-95% oxygen). However, in another example, the ozone gas 610 may have a concentration of approximately 5-7.5% ozone combined with a mixture of gases that include oxygen, as well as other constituent/contaminant gases that make up the balance of the total gas concentration (e.g. nitrogen, carbon dioxide, and the like). Additionally or alternatively, other concentrations of ozone gas may be utilized with the various processes described herein (e.g. 4-8% ozone, 3-9% ozone, 2-10%, 1-15% ozone, 1.8-2.0% ozone, or 1.9% ozone among others).

In one example, FIG. 6C schematically depicts a third point during the process for improving adhesion of an insulating foam to one or more molded polymeric surfaces 603 of a polymeric outer shell 602. As such, FIG. 6C schematically depicts the mass of ozone gas further displacing the mass of air 604 out through the second opening 608.

In one implementation, the ozone gas 610 may serve to functionalize the molded polymeric surfaces 603 of the internal cavity 605. As such, ozone is an oxidizing agent that may be utilized to functionalize (oxidize) a surface of polyethylene, among others. As such, in one implementation, functionalization of the molded polymeric surfaces 603 may be based upon, in addition to the concentration of the ozone gas 610, a time of exposure to the ozone gas 610. In this way, filling the internal cavity 605 with the ozone gas 610 from the first opening 606, below the second opening 608, may result in improved distribution of the ozone gas 610 throughout the internal cavity 605, and such that a higher percentage of the internal surfaces 603 are exposed to the ozone gas 610. In one specific example, the ozone gas 610 may be injected through the first opening 606 with a flow rate that results in the ozone gas 610 completely displacing the air 604 within the internal cavity 605, or completely filling a volume of the internal cavity 605, in at least four minutes. In another example, the ozone gas 610 may be injected through the first opening 606 with a flow rate that results in the ozone gas completely displacing a mass of air 604 within the internal cavity 605, or completely filling a volume of the internal cavity 605, in approximately 4 to 6 minutes. In this way, a flow rate of ozone gas 610 into the internal cavity 605 may be based upon a volume of the internal cavity 605. For example, for an internal cavity 605 having a volume of 60 L, a flow rate of at least 15 L/min ozone gas 610 (at, for example, a concentration of 5-7.5% ozone) may be utilized to fill the volume in at least four minutes. Accordingly, FIG. 6D schematically depicts the internal cavity 605 completely filled with ozone gas 610. However, in other examples, alternative flow rates of the ozone gas 610 may be utilized to fill the internal cavity 605 in at least one minutes, at least two minutes, or at least 3 minutes, among others.

In another implementation, the ozone gas 610 may be injected through the first opening 606, and may be configured to displace a mass of air 604 within the internal cavity 605 such that the ozone gas 610 partially fills a volume of the internal cavity 605. As such, the ozone gas 610 may be configured to fill at least 60% of a volume of the internal cavity 605. In other examples, the ozone gas 610 may be configured to fill at least 70%, at least 75%, at least 80%, at least 90%, at least 97%, at least 98%, at least 99%, at least 99.5%, at least 99.7%, or at least 99.9% of a volume of the internal cavity 605. As such, the ozone gas 610 may be configured to fill a portion of a volume of the internal cavity 605 (portion as previously described) in at least one minute, at least two minutes, at least three minutes, at least four minutes, in 4-6 minutes, in 4-8 minutes, in 4-10 minutes, or in 4-12 minutes, among others.

In one example, as soon as a volume of an internal cavity 605 may filled with the ozone gas 610, the internal cavity 605 may be flushed with a gas to remove the ozone gas 610. As such, in one example, and as schematically depicted in FIG. 6E, compressed air 604 may be injected in through the first opening 606 to flush the internal cavity 605. However, in another example, a gas configured to flush the internal cavity 605 may be nitrogen, helium, or argon gas, among others. Accordingly, in one example, compressed air may be injected through the first opening 606 into the internal cavity 605 with a flow rate configured to completely exchange a volume of gas within the internal cavity 605 multiple times within, for example, two minutes. In one specific example, a flow rate of air into the internal cavity 605 may be such that a volume of gas within the internal cavity 605 may be exchanged at least one time within two minutes. As such, for an exemplary internal volume 605 of 60 L, a flow rate of air in through the first opening 606 may have a flow rate of at least 30 L/min. in another example, a flow rate of air into the internal cavity 605 may be such that a volume of gas within the internal cavity may be exchanged at least one time, at least two times, at least five times, or at least 10 times within one minute. Accordingly, FIG. 6E schematically depicts a mass of ozone gas 610 partially removed from the internal cavity 605 by a mass of air 604.

In one example, a mass of ozone gas 610 within the internal cavity 605 may be fully removed by the introduction of a mass of gas (e.g. air 604, or another gas) to flush the internal cavity 605. However, in another example, a mass of ozone gas 610 within the internal cavity 605 may be partially removed by the introduction of a mass of gas (e.g. air 604, or another gas), to flush internal cavity 605. As such, in one implementation, at least 90% of a mass of ozone gas 610 within the internal cavity 605 may be removed by the introduction of a mass of gas (e.g. air 604). In other implementations, at least 95%, at least 97%, at least 97.5%, at least 98%, at least 99%, at least 99.5%, at least 99.7%, or at least 99.9% of a mass of ozone gas 610 within the internal cavity 605 may be removed by the introduction of a mass of gas (e.g. air 604) in order to flush the internal cavity 605.

FIG. 6F schematically depicts the mass of air 604 fully filling a volume of the internal cavity 605, and such that all of the ozone gas 610 has been removed from the internal cavity 605. In this way, the molded polymeric surfaces 603 of the outer shell 602 are functionalized in FIG. 6F, such that improved adhesion between the surfaces 603 and an insulating foam may be achieved. As such, FIG. 6G schematically depicts an insulating foam 612 being injected through opening 606 into the internal cavity 605. In one implementation that injection of the insulating foam 612 may be through the second opening 608, without departing from the scope of these disclosures. Accordingly FIG. 6H schematically depicts the insulating container 600 having an internal cavity 605 fully filled with an insulating foam 612. As such, the first opening 606 and the second opening 608 may be sealed with the insulating foam.

Figure 7:
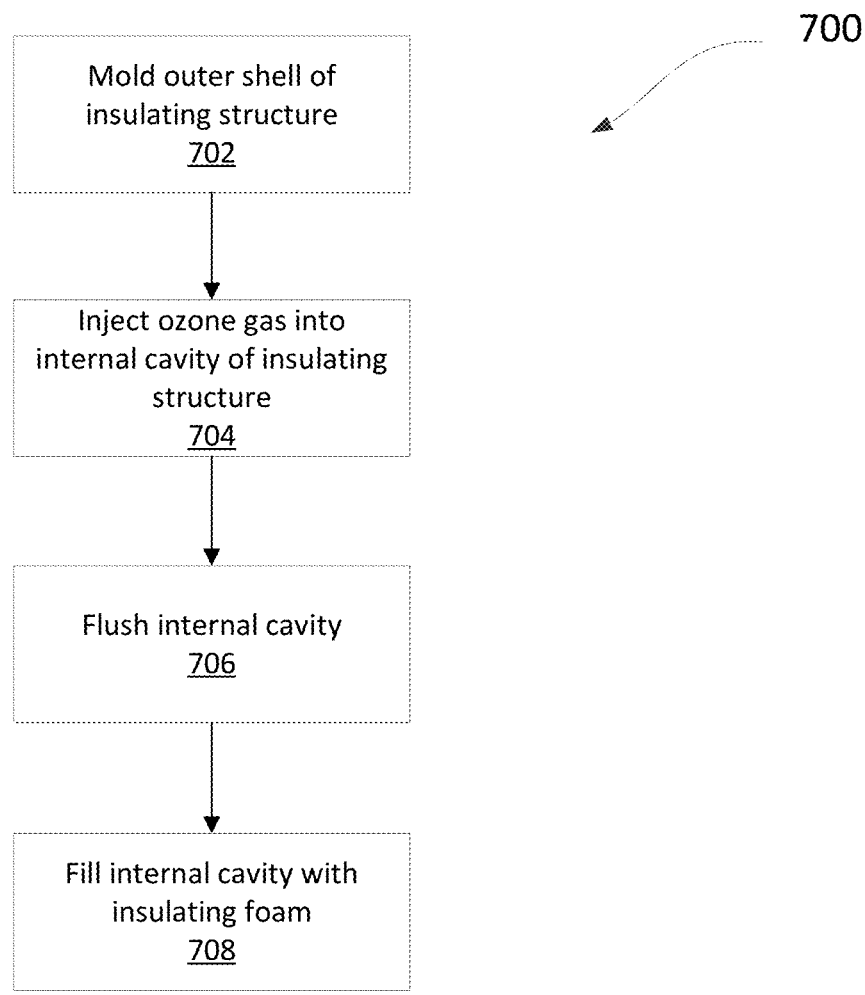
FIG. 7 schematically depicts a flowchart of a process for improving adhesion of an insulating foam to one or more molded polymeric surfaces of an insulating container, according to one or more aspects described herein.

FIG. 7 schematically depicts a flowchart of a process 700 for improving adhesion of an insulating foam to one or more molded polymeric surfaces of an insulating container. As such, process 700 may be utilized with system 500, as depicted in FIG. 5. Further, process 700 may apply various details described in relation to FIG. 5 and FIGS. 6A-6H. In one example, process 700 may include molding of an outer shell of an insulating structure (such as insulating structures 200, 300, or 400, among others). Accordingly, one or more molding processes may be utilized to mold the outer shell insulating structure from one or more polymers. In one specific example, one or more rotational molding processes may be utilized to mold an outer shell of an insulating structure from polyethylene. As such, those of ordinary skill in the art will recognize specific details of rotational molding that may be utilized with the systems and methods described herein, and in particular, with process 700, without departing from the scope of these disclosures. In one implementation, molding of an outer shell of an insulating structure may be associated with block 702 of process 700.

In one implementation, process 700 may include injection of ozone gas into an internal cavity of the molded insulating structure. In this way, the ozone gas may be utilized to functionalize one or more internal surfaces (molded polymeric surfaces) of an internal cavity, and such that this functionalization may improve adhesion of a hydrophilic adhesive to a hydrophobic molded polymeric surface, as molded. In one specific example, ozone gas may be injected into an internal cavity of a molded outer shell of an insulating structure through a first opening that is positioned below a second opening, and such that air within the internal cavity may be displaced out through the second opening as the ozone gas is injected. Further, ozone gas may be injected in through the first opening at a flow rate such that a volume of an internal cavity is filled with ozone gas in at least four minutes, or in approximately 4 to 6 minutes, among others. In one example, and as described in relation to FIGS. 6A-6H, ozone gas may be injected in through the first opening at a flow rate such that a volume of an internal cavity is filled with ozone gas in at least one minute, at least two minutes, or at least three minutes, among others. Additionally, the ozone gas injected may have a concentration of approximately 5 to 7.5% ozone. In another example, the ozone gas injected may have a concentration of approximately 4-9% ozone, 3-10% ozone, or 1-15% ozone, as described in relation to FIG. 5. Accordingly, in one example, the ozone gas may have a concentration of at least 1% ozone. In another example, the ozone gas may have a concentration of approximately 1.9% ozone, or 1.8-2.0% ozone. In yet another example, and as described in relation to FIGS. 6A-6H, ozone gas may be injected into an internal cavity to fill, or partially fill a volume of the internal cavity. Accordingly, in one example, injection of ozone gas into an internal cavity of an insulating structure may be associated with block 704 of process 700.

In one example, once an internal cavity of an insulating container has been filled, or substantially filled, with the ozone gas, the internal cavity may be flushed with a gas (e.g. air, nitrogen, argon, helium gas, or another inert gas) to remove part or all of the ozone gas. In one implementation, a flow rate of air into the internal cavity to flush the internal cavity of part or all ozone gas may be such that a volume of the internal cavity is filled with the gas (e.g. air, nitrogen, argon, helium gas, or another inert gas) within one minute. In another implementation, a flow rate of air into the internal cavity to flush the internal cavity of part, or all, ozone gas may be such that a volume of gas within the internal cavity is completely exchanged multiple times within one minute. In yet another implementation, a gas (e.g. air, nitrogen, argon, helium gas, or another inert gas) may be injected into the internal cavity for at least two minutes to flush ozone gas out from the cavity, and such that a volume of gas within the internal cavity is completely exchanged at least once within two minutes. In one implementation, ozone gas may be injected into the internal cavity for approximately 4-6 minutes, or approximately 1-15 minutes. In another implementation, ozone gas may be injected into the internal cavity for at least 1 minute, or at least 2 minutes. In one example, flushing of the internal cavity with air may begin upon completion of the ozone gas injection. As such, flushing of the internal cavity may begin at approximately 4-6 minutes, or approximately 1-15 minutes after the commencement of ozone gas injection into the internal cavity. In another example, there may be a delay between completion of the ozone gas injection, and the start of the flushing step. As such, there may be a delay of approximately 30 seconds, one minute, or two minutes, among others, between the end of the ozone gas injection step and the start of the flushing step. In another example, the internal cavity may be flushed with air for approximately 1 minute, or approximately 2 minutes, among others. In one specific example, for an ozone gas injection period of 5 minutes, and a flushing period of two minutes, without a delay between an end of the ozone gas injection period and a start of the flushing period, the flushing of the internal cavity with air may commence at 5 minutes after the ozone gas injection process was started and end at 7 minutes after the ozone gas injection process was started. In one example, flushing the internal cavity of the insulating structure with air may be associated with block 706 of process 700. In one example, the flushing of the internal cavity (using, e.g. gas source 504) may use a purge/flush gas pressure of 10-50 psi, a purge/flush gas flow rate of 500-1000 liters per minute, and a purge/flush time of at least two minutes. It is contemplated, however, that any purge/flush gas pressure, purge/flush gas flow rate, and/or purge/flush time may be used, without departing from the scope of these disclosures.

In one implementation, process 700 may, upon flushing an internal cavity of the insulating structure with air, inject insulating foam into the internal cavity. In one specific example, this insulating foam may be polyurethane foam. Accordingly, injection of insulating foam into the internal cavity of the insulating structure may be associated with block 708 of process 700.

In one implementation, the various processes described in relation to FIGS. 5, 6 and 7 may be described utilizing actual (normal) volume flow rate values for gases (L/min). In another example, standard volume flow rate values for gases (L/min) may be utilized with the systems and methods described herein, without departing from the scope of these disclosures. Additionally, the various processes described in relation to FIGS. 5, 6 and/or 7 to inject ozone gas and/or air into a cavity of an insulating container/structure may be carried out at approximately room temperature. In another example, however, injection of the ozone gas may be carried out below room temperature, or above room temperature.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

What is claimed is:

1. A method of manufacturing an insulating container, comprising:
    molding an external structure of the insulating container from a polymer, the external structure comprising:
        an inner trough;
        an outer shell coupled to the inner trough by a top edge surface;
        an internal cavity spaced between the inner trough and the outer shell and extending around four sides and a base of the external structure;
        a first opening extending into the internal cavity at a first corner of a base surface of the outer shell;
        a second opening extending into the internal cavity at a second corner, opposite the first corner, of the base surface of the outer shell;
    positioning the external structure such that the second opening is above the first opening;
    injecting an ozone gas containing at least 1.9% ozone into the first opening;
    displacing, with the ozone gas, a mass of air from the internal cavity out through the second opening;
    flushing the internal cavity with air to remove ozone gas from the cavity; and
    injecting an insulating foam into the internal cavity.

2. The method of claim 1, wherein a volume flow rate of the ozone gas into the first opening is such that a volume of the internal cavity is filled in at least 4 minutes.

3. The method of claim 1, wherein a volume flow rate of the ozone gas into the first opening is such that a volume of the internal cavity is filled in at most 10 minutes.

4. The method of claim 1, wherein the flushing the internal cavity with air further comprises flushing for at least 2 minutes.

5. The method of claim 1, wherein the flushing the internal cavity with air to remove ozone gas comprises removing at least 95% of the ozone gas from the cavity.

6. The method of claim 1, wherein the polymer is polyethylene.

7. The method of claim 1, wherein the insulating foam is polyurethane.

8. The method of claim 1, wherein the ozone gas is injected at room temperature.

9. A method for producing an insulating structure, comprising:
    (a) molding an outer shell of the insulating structure from a polymer, the outer shell comprising:
        an internal cavity;
        a first opening extending into the internal cavity;
        a second opening extending into the internal cavity;
    (b) positioning the outer shell such that the second opening is above the first opening;
    (c) injecting an ozone gas containing at least 1.9% ozone into the first opening;
    (d) displacing, with the ozone gas, a mass of air from the internal cavity out through the second opening;
    (e) at a time after step (d), flushing the internal cavity with a gas to remove at least 97% of the ozone gas from the cavity; and
    (f) injecting an insulating foam into the internal cavity.

10. The method of claim 9, wherein a volume flow rate of the ozone gas into the first opening is such that a volume of the internal cavity is filled in at least 4 minutes.

11. The method of claim 9, wherein a volume flow rate of the ozone gas into the first opening is such that a volume of the internal cavity is filled in approximately 2-14 minutes.

12. The method of claim 9, wherein step (e) begins approximately 2 to 14 minutes after step (c) began.

13. The method of claim 9, wherein step (e) is completed at least two minutes after step (e) began.

14. The method of claim 9, wherein step (d) of filling the internal cavity with the ozone gas to displace a mass of air out through the second opening comprises filling at least 90% of the cavity with ozone gas.

15. The method of claim 9, wherein step (d) of filling the cavity with the ozone gas to displace a mass of air out through the second opening comprises filling at least 95% of the cavity with ozone gas.

16. The method of claim 9, wherein the polymer is polyethylene.

17. The method of claim 9, wherein the gas is air.

18. The method of claim 9, wherein the first opening is adjacent a bottom portion of the internal cavity and the second opening is adjacent a top portion of the internal cavity.

19. A method for manufacturing a cooler, comprising:
(a) molding an external structure of the cooler from polyethylene, the external structure comprising:
an inner trough;
an outer shell coupled to the inner trough by a top edge surface;
an internal cavity spaced between the inner trough and the outer shell and extending around four sides and a base of the external structure;
a first opening extending into the internal cavity at a first corner of a base surface of the outer shell;
a second opening extending into the internal cavity at a second corner, opposite the first corner, of the base surface of the outer shell;
(b) positioning the external structure such that the second opening is above the first opening;
(c) injecting an ozone gas containing at least 1.9% ozone into the first opening;
(d) flushing the internal cavity with air to remove ozone gas from the internal cavity; and
(e) filling the cavity with insulating foam.

20. The method of claim 19, wherein the insulating foam is polyurethane.

* * * * *